(12) United States Patent
Brunelle

(10) Patent No.: US 9,186,023 B2
(45) Date of Patent: Nov. 17, 2015

(54) BATHTUB FORMED OF INTERCONNECTED SHELLS AND METHOD OF DELIVERING BATHTUBS

(75) Inventor: Henry Brunelle, Québec (CA)

(73) Assignee: GESTION ULTRA INTERNATIONALE INC, St-Nicolas, Quebec ( * ) Notice: Subject to any disclaimer, the term of this patent is extended or adjusted under 35 U.S.C. 154(b) by 561 days.

(21) Appl. No.: 13/556,254

(22) Filed: Jul. 24, 2012

(65) Prior Publication Data
US 2012/0284913 A1 Nov. 15, 2012

(30) Foreign Application Priority Data
Oct. 19, 2011 (CA) ...................................... 2755846

(51) Int. Cl.
*A61H 33/06* (2006.01)
*A47K 3/00* (2006.01)
*B29L 31/00* (2006.01)
*B29C 51/26* (2006.01)

(52) U.S. Cl.
CPC *A47K 3/00* (2013.01); *A61H 33/06* (2013.01); *B29C 51/266* (2013.01); *B29L 2031/7692* (2013.01); *Y10T 29/49826* (2015.01)

(58) Field of Classification Search
CPC .................................................. A61H 33/025
USPC ........................................................ 4/538–595
See application file for complete search history.

(56) References Cited

U.S. PATENT DOCUMENTS

| 3,934,278 | A | * | 1/1976 | Schrock ............................. 4/593 |
| 4,669,133 | A | * | 6/1987 | Blecher et al. ..................... 4/538 |
| 5,345,621 | A | * | 9/1994 | Livingston ..................... 4/541.1 |
| 5,960,489 | A | * | 10/1999 | Hanel et al. ........................ 4/538 |
| 6,011,336 | A | * | 1/2000 | Mathis et al. .................... 310/91 |
| 6,243,889 | B1 | * | 6/2001 | Ducharme et al. ................ 4/545 |
| 6,481,029 | B1 | * | 11/2002 | Mateina ............................. 4/592 |
| 7,784,120 | B2 | * | 8/2010 | Spicer ................................ 4/592 |
| 8,453,275 | B2 | * | 6/2013 | May et al. ........................ 4/541.1 |
| 2006/0130228 | A1 | * | 6/2006 | Lebrun et al. ...................... 4/545 |

* cited by examiner

*Primary Examiner* — Lori Baker
(74) *Attorney, Agent, or Firm* — Norton Rose Fulbright Canada LLP; Alexandre Daoust

(57) ABSTRACT

A hydromassaging bathtub is formed by molding an outer shell having an outer finished surface with an acrylic component therein and a plurality of air jets forming through holes, and an inner reinforcing support shell having channels molded in at least some of the inner side walls thereof. The inner shell has floor supports molded in a bottom wall thereof. The outer shell is bonded in the inner shell with the channels sealingly bonded about the plurality of airjet forming through holes. The method comprises stacking the similar shells together for shipping to an assembling and distribution site and for storage whereby to provide several commercial advantages in the manufacture and distribution of the bathtubs.

18 Claims, 3 Drawing Sheets

BATHTUB FORMED OF INTERCONNECTED SHELLS AND METHOD OF DELIVERING BATHTUBS

TECHNICAL FIELD

The present invention relates to the manufacture and commercialization of bathtubs, and particularly but not exclusively, to hydromassaging bathtubs formed of at least two molded shells and incorporating jets and conduits formed in the manufacture thereof.

BACKGROUND ART

It is known to fabricate bathtubs and the like by thermoforming rigid thermoplastic shells and bonding the shells together such as described in U.S. Pat. No. 5,494,718. As described in that patent, it is desirable to eliminate methods using spraying techniques which are essentially manual in the formation of bathtubs and wherein a curing period is desirable. With such spraying methods, volatile organic compounds are emitted and this is of course hazardous to the health of people in the immediate environment of the manufacturing process. That patent is primarily concerned with the reduction in the wall thickness of a thermoformed vessel by the use of a reinforced cradle. They attempt to eliminate volatile organic compound emissions and provide easy recycling without sacrificing rigidity of the bathtubs. As described, it is also desirable to reduce flammability in the manufacturing process and smoke emissions which are hazardous. This patent is primarily concerned with the support formed of a glass fiber reinforced thermoplastic shell having a specific flexural modulus. The fibers are also short glass fibers which are hazardous during the shell fabrication process and disposal. When fabricating bathtubs with glass fiber coatings, it is necessary to test each bathtub for air and water leakages for the reason that there are often air pin holes in fiberglass coatings and this can be problematic during use. Also, by making bathtubs using thermoformed shells, the total weight of the bathtub is reduced as compared with conventional methods using fiberglass. This also results in a reduction in transportation cost as well as providing easier handling of the material due to its lighter weight. Also, the new process of manufacturing poses a reduced fire hazard and accidents to the workforce as there is less manipulation and mechanization. There is also acetone released in the fiberglass coating manufacturing process and this is hazardous to human health.

SUMMARY OF INVENTION

It is a feature of the present invention to provide a hydromassaging bathtub formed from at least two thermoformed plastic molded shells and which eliminates fiberglass in its construction.

Another feature of the present invention is to provide a hydromassaging bathtub formed of an outer molded shell having a finished surface having an acrylic component and a reinforcing support shell having channels molded in at least some of the inner side walls thereof and which shells are bonded together with the channels forming conduits sealingly bonded about a plurality of air jet forming through holes formed in the outer shell.

Another feature of the present invention is to provide a hydromassaging bathtub formed of an outer and an inner shell with the outer shell having jet forming through holes and the reinforcing support shell having channels molded in at least some of the inner side walls thereof and wherein the like shells are stacked together to reduce storage space and shipping costs and wherein the shells are assembled together only prior to shipping to customers whereby resulting in an economy in the use of floor space and providing for fast and economic delivery to customers.

Another feature of the present invention is to provide a method of delivering bathtubs having massaging jets in at least some of the side walls of the bathtub and conduits secured to at least some of the outer walls of the bathtub and which method provides various features such as faster manufacturing and delivery time, reduction in transportation costs, reduction in fabrication costs, less polluting, recyclable and provides a more healthy work environment.

Another feature of the present invention is to provide a method of delivering bathtubs wherein like shells are stacked one inside the other and shipped and stored at an assembling and distribution site and wherein the shells are assembled to form bathtubs only to supply customer demands in a designated geographical region associated with the site thereby reducing costs.

It is another feature of the present invention to fabricate a hydromassaging bathtub formed of an outer and inner shell bonded together and wherein no glass fibers are utilized as reinforcing materials.

According to the above features, from a broad aspect, the present invention provides a hydromassaging bathtub formed from at least two thermoformed plastic molded shells. The shells comprise an outer shell having an outer finished surface with an acrylic component therein. The outer shell has a plurality of air jet forming through holes disposed in a predetermined pattern in side walls thereof. The bathtub is also formed with an inner reinforcing support shell shaped to receive the outer shell in close-fit therein. The inner reinforcing support shell has channels molded in an inner surface of at least some side walls thereof. The channels have an open end facing inwardly of the side walls and disposed to surround the through holes disposed in the predetermined pattern. Floor support means are molded in the bottom wall of the inner reinforcing support shell. Bonding means immovably secures the outer shell into the inner reinforcing support shell with the channels sealingly bonded about the plurality of air jet forming through holes. A plurality of like inner and outer shells are stackable one inside the other for storage and shipping purposes.

According to a further broad aspect of the present invention there is provided a method of delivering bathtubs having massaging jets in at least some of the side walls of the bathtub and conduits secured to at least some of the outer walls thereof. The method comprises forming the bathtubs from at least two thermoformed plastic molded shells at a factory with one of the shells being an outer shell having an outer finished surface, and the other of the shell being an inner reinforcing support shell shaped to receive the outer shell in close-fit therein. The outer shell is adapted to provide the massaging jets. The inner reinforcing support shell is adapted to provide conduits to the massaging jets. The method further comprises stacking a plurality of the outer shells one inside the other to form a stack of outer shells. It further comprises stacking a plurality of the inner reinforcing support shells one inside the other to form a stack of inner reinforcing support shells. The method further comprises shipping a predetermined quantity of the stacks of shells to one or more assembling and distribution sites where the outer and inner shells are stored and assembled to form the bathtubs for further shipping to supply customer demands in a designated geographical region of the one or more assembling and distribution sites and thereby reducing costs in the production of the bathtubs.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
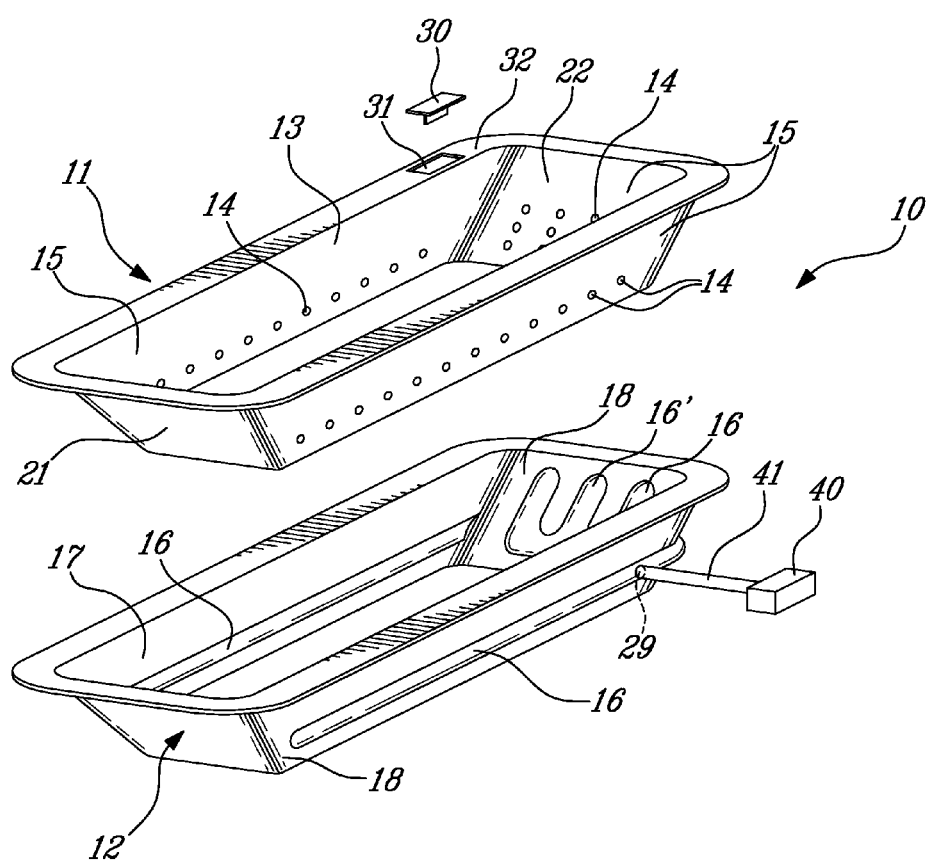
FIG. 1 is an exploded perspective view showing the construction of a hydromassaging bathtub formed in accordance with the present invention.

Referring now to the drawings and more particularly to FIGS. 1 to 4, there is shown generally at 10, in FIG. 1, a hydromassaging bathtub formed in accordance with the present invention. As shown in these drawings, the bathtub 10 is formed from at least two thermoformed plastic molded shells, herein an outer shell 11 and an inner reinforcing support shell 12. The outer shell 11 has an outer finish surface 13 which has an acrylic component therein to provide a smooth and shiny outer surface comfortable to a bather person and hygienic. It also has a plurality of air jet forming through holes 14 disposed in a predetermined pattern in at least some surrounding side walls 15 thereof. These through holes 14 are of predetermined diameter and drilled at specific spacing and pattern.

Figure 2:
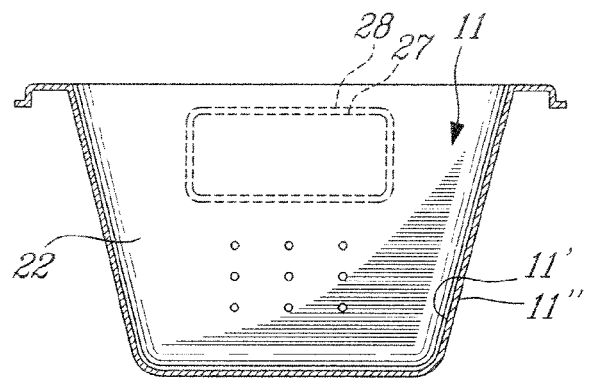
FIG. 2 is a transverse section view showing the construction of the outer shell which is provided with an outer finish surface component and as hereinshown the outer shell is formed with two shell components.

The inner reinforcing support shell 12 is also thermoformed from a single sheet of plastic material having a desired amount of rigidity and it is shaped to receive the outer shell 11 in close fit therein. The inner reinforcing support shell 12 has channels 16 molded in an inner surface 17 of at least some of the surrounding side walls 18 thereof. The channels 16 have an open end 16', as better shown in FIG. 5A, facing inwardly of the side walls 18 and disposed to surround the through holes 14 disposed in the predetermined pattern. There may be two or more of the channels 16 surrounding different groups of through holes 14. As shown in FIG. 2, the channel 16 in the rear wall 22 of the support shell 12 has a loop or wave formation 16' which is known as a "Hartford" loop to trap water that may seep into the channels 16 through the through holes 14, to isolate the blower motor 40 suspended on the rear wall. The blower motor 40 connects to the end of the loop 16'.

Figure 3:
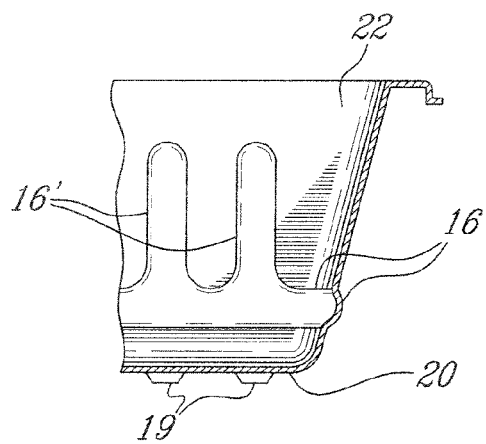
FIG. 3 is a fragmented transverse section view showing the construction of the inner reinforcing support shell showing an example of the channels molded in at least some of the side walls thereof.
Figure 4:
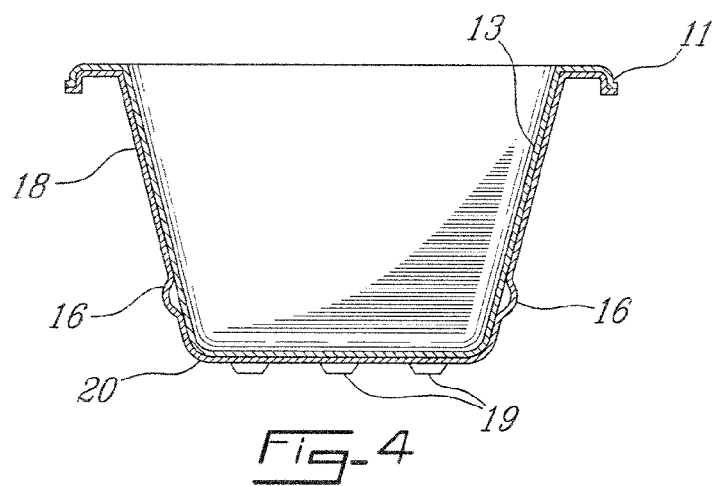
FIG. 4 is a schematic transverse section view showing the assembled outer and inner shells to form a hydromassaging bathtub.

As better seen from FIGS. 3 and 4, the inner reinforcing support shell 12 is further provided with floor support means in the form of elongated floor supporting ridges 19 molded in the bottom wall 20 thereof. The floor support ridges 19 taper longitudinally between the front and rear walls 21 and 22 of the bathtub 10, as shown in FIG. 1. Before assembly, the inner shells 12 are stacked one inside the other for storage purpose as well as the outer shells 11, thus requiring very little storage space due to the superimposition of the shells. When it is desired to supply a finished bathtub, an outer shell 11 is bonded inside an inner shell 12. There are substantial financial and health benefits in producing a bathtub in this fashion. It is to be noted that this bathtub is constructed free of any fiberglass coatings which fiberglass is a health hazard and therefore requiring special ventilated rooms and air filtration systems to remove fibers in the air in the environment of its fabrication. The workforce also needs special masks and the air in the room requires continuous cleaning. Also, the disposal of any manufactured product using fiberglass fibers needs to be buried and this is costly. Another cost advantage of manufacturing bathtubs using this method is that it requires less space due to the fact that the shells are stored inside one another and only assembled when there is customer demand with the assembly being less intensive and less costly than previous methods using fiberglass coatings. By requiring less floor space there is also a saving in building and heating costs and other costs associated therewith.

When it is necessary to fabricate bathtubs, herein hydromassaging bathtubs from the supply of shells, the outer shells 11 are simply bonded inside the outer shells 12 by the use of various bonding methods such as providing a thin pulverized resin coating on the inner surface 17 of the inner shell 12 and about the channels 16, but not between the through holes 14, whereby when the shells are bonded together a conduit is formed by the channels 16 and communicate with all of the through holes 14 formed in the outer shell 11. The binding agent may also be one which is activatable and is hardened by ultraviolet radiation. Alternatively, a catalyst type glue or a polyurethane foam which is expandable or not may be used. Further, the bonding could be done by high frequency welding methods well known in the art.

As shown in FIGS. 2 and 4, the outer shell 11 may also be formed by two shells glued to one another, namely an outer thermoformed shell 11' formed of acrylic plastics material and an inner thermoformed shell 11" formed of ABS plastics material. Of course, other non-fiberglass plastics materials may be used to structure the outer shell 11 to provide rigidity. As shown in FIG. 2, the rear wall 22 may also have a shaped cavity 28 adapted to receive an electric heating mesh 27 glued therein to heat the upper back portion of the rear wall 22 where a user person's back is rested on when bathing.

Although not shown, but obvious to a person skilled in the art, the floor engaging ridges 19 may be formed as elongated channels in the outer surface of the bottom wall 20 and adapted to receive therein a rigid floor engaging member, such as an elongated woodpiece immovably secured in the channel by glue or other binding material.

It can be seen that the method of manufacturing and commercializing bathtubs of the type as above-described has various advantages as above-mentioned. Another important advantage of such manufacture is that it provides a new means of commercialization of bathtubs to further reduce costs by a substantial reduction in transportation costs. Because the inner shells as well as the outer shells can be stacked in individual groups, these groups of stacked shells can be shipped in large quantities such as in tractor-trailer transport vehicles as compared to assembled bathtubs which require large spaces, most of which is occupied by air. Therefore, the method of commercialization includes shipping predetermined quantities of stacks of shells to assembling and distribution sites where the shells are stored and assembled to form bathtubs only whenever there is a customer demand in a designated geographical region associated with several assembling and distribution sites thereby reducing shipping, storage and operating costs for the production and delivery of bathtubs to customers.

With the hydromassaging bathtub as shown in FIG. 1, these shells are shipped with hardware kits necessary to complete a hydromassaging bathtub. Such hardware will consist of electronic and electrical controls, such as a control 30 schematically shown in FIG. 1 ready to be received in cavities or holes 31 formed in the top ledge 32 of the bathtub as well as blower motors, LED lighting, heaters and connectors to complete the bathtub assembly.

Figure 5A:
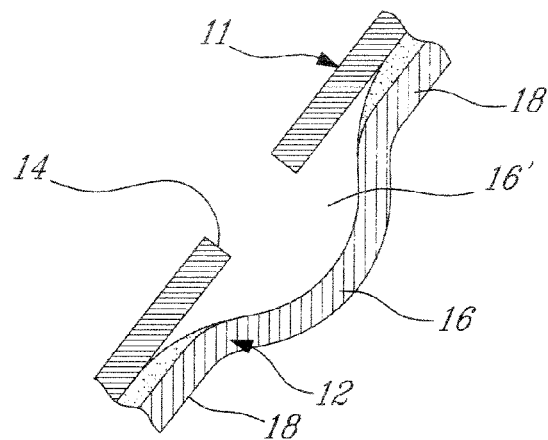
FIG. 5A is a fragmented section view showing the positions of the molded pressurized air channels of the inner shell with respect to the jet forming through holes formed in the outer shell when the shells are bonded to one another.
Figure 5B:
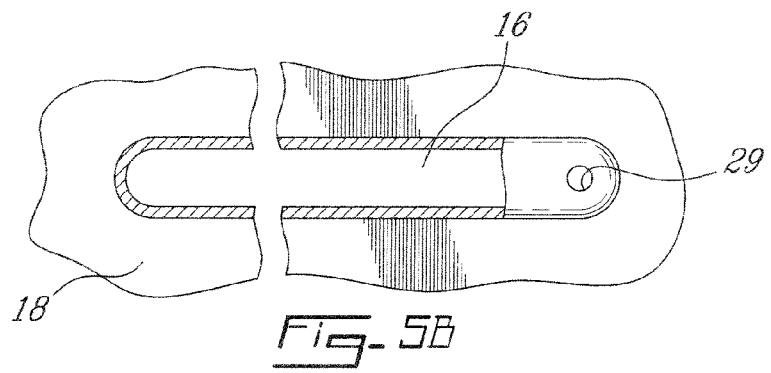
FIG. 5B is a fragmented side view showing an example of the molded channels formed in an inner surface of a side wall of the inner reinforcing support shell.

FIGS. 5A and 5B show a hydromassaging bathtub wherein the through holes 14 constitute air jets wherein air under pressure is injected into the channels 16 via an inlet hole 29 (see FIGS. 1 and 5B) adapted to receive an air blower coupling 41 (e.g. a hose coupling) connected to a blower and a heating element to heat the compressed air.

Figure 6:
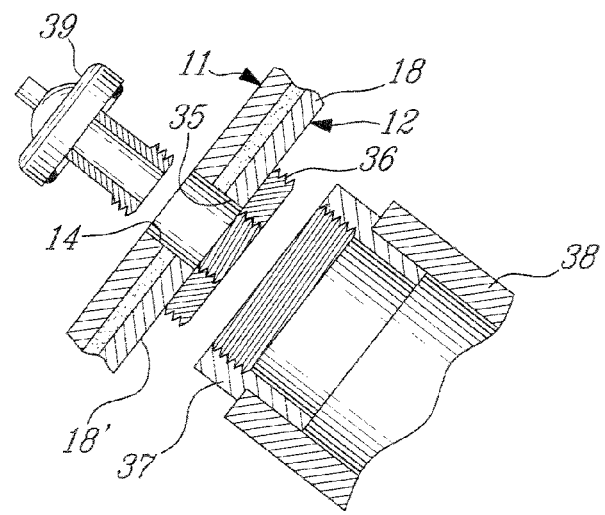
FIG. 6 is an exploded view showing the construction of a massaging directional water jet and conduit secured to the inner and outer shells.

FIG. 6 shows another modification of the outer and inner shells 11 and 12 and wherein the inner shell 12 has larger through bores 35 formed in the side walls thereof and positioned to circumscribe larger through holes 14 in the outer shell. A hose coupling 36 is also secured to the outer surface 18' of the side walls 18 of the inner shell 12 with the couplings 36 adapted to receive connectors 37 of hoses 38 in which water under pressure is circulated from the bathtub by a pump, not shown. Adjustable jet couplings 39 are positioned in the through holes 14 and 35 and connected to the coupling 36 whereby the bathtub is a whirlpool or spa-type bathtub.

It is within the ambit of the present invention to cover any obvious modifications of the preferred embodiment described herein provided such modifications fall within the scope of the appended claims.

I claim:

1. A hydromassaging bathtub formed from at least two thermoformed plastic molded shells, said shells comprising: an outer shell having an outer finished surface with an acrylic component therein, said outer shell having a plurality of air jet forming through holes disposed in a predetermined pattern in side walls thereof, and an inner reinforcing support shell shaped to receive said outer shell in close-fit therein, said inner reinforcing support shell having channels molded in an inner surface of at least some side walls thereof, said channels having an open end facing inwardly of said side walls and disposed to surround said through holes disposed in said predetermined pattern, floor support molded in said bottom wall of said inner reinforcing support shell, and bonding to immovably secure said outer shell into said inner reinforcing support shell with said channels sealingly bonded about said plurality of air jet forming through holes, a plurality of said inner and outer shells being stackable one inside the other for storage and shipping purposes.

2. A hydromassaging bathtub as claimed in claim 1 wherein each said outer and inner shells have opposed side walls, a bottom wall, a rear wall and a front wall, and a top ledge; said outer shell having a smooth outer surface adapted for close fit with an inner surface of said inner shell.

3. A hydromassaging bathtub as claimed in claim 2 wherein said outer shell is formed by two thermoformed shells of acrylic and ABS plastic material bonded together one inside the other with the acrylic shell on the outside.

4. A hydromassaging bathtub as claimed in claim 2 wherein said bonding is comprised by one of a fine coating of resin, a fine coating of a bonding agent activatable by ultraviolet radiation, a polyurethane foam material, a catalyst glue or by ultrasound welding.

5. A hydromassaging bathtub as claimed in claim 2 wherein said floor support is constituted by elongated support ridges formed longitudinally in said bottom wall of said inner reinforcing support shell in a spaced-apart arrangement.

6. A hydromassaging bathtub as claimed in claim 5 wherein said elongated support ridges are longitudinally tapered between said front and rear walls.

7. A hydromassaging bathtub as claimed in claim 5 wherein said elongated support ridges are formed with an elongated channel in an outer surface thereof adapted to receive a rigid floor engaging member therein, said rigid floor engaging member being immovably secured in respective ones of said elongated channels of said support ridges.

8. A hydromassaging bathtub as claimed in claim 2 wherein said channels disposed in said rear wall of said support shelf are loop-shaped to trap water therein and isolate said water from a blower motor suspended on said rear wall and connected to an entry end of said loop-shaped channel.

9. A hydromassaging bathtub as claimed in claim 2 wherein said rear wall of said support shell is provided with a shaped cavity to receive an electric heating mesh secured therein.

10. A method of delivering bathtubs having massaging jets in at least some of the side walls of the bathtub and conduits secured to at least some of the outer walls thereof, said method comprising:
  i) forming said bathtubs from at least two thermoformed plastic molded shells at a factory, one of said shells being an outer shell having an outer finished surface, the other of said shells being an inner reinforcing support shell shaped to receive said outer shell in close-fit therein, said outer shell being adapted to provide said massaging jets, said inner reinforcing support shell being adapted to provide conduits to said massaging jets;
  ii) stacking a plurality of said outer shells one inside the other to form a stack of outer shells;
  iii) stacking a plurality of said inner reinforcing support shells one inside the other to form a stack of inner reinforcing support shells;
  iv) shipping a predetermined quantity of said stacks of shells to one or more assembling and distribution sites where said outer and inner shells are stored and assembled to form said bathtubs for further shipping to supply customer demands in a designated geographical region of said one or more assembling and distribution sites and thereby reducing costs in the production of said bathtubs.

11. A method as claimed in claim 10 wherein said bathtubs are hydromassaging bathtubs and wherein said step i) further comprises molding channels in at least some inner side walls of said inner reinforcing support shell with said channels oriented to bridge said massaging jets when said outer shell is immovably secured inside said inner shell with said channels sealingly bonded about said massaging jets.

12. A method as claimed in claim 11 wherein said massaging jets are formed by drilling through holes of predetermined diameter and spacing through said side walls of said outer shell, said holes constituting hydromassaging jets when air under pressure is applied to said channels, said channels constituting said conduits.

13. A method as claimed in claim 12 wherein there is further provided the step of applying a glue about said channels to provide a sealed conduit about said through holes, said conduit having an opening to connect to an air blower coupling.

14. A method as claimed in claim 10 wherein there is further provided the step of drilling through holes in said inner and outer shell and said reinforcing support shell coinciding with one another, and bonding a coupling to an outer surface of said inner reinforcing support shell about said through holes, said coupling being adapted to secure massaging jets thereto from said outer finished surface of said outer shell and conduits adjacent said outer surface of said reinforcing support shell after said outer shell is secured inside said inner reinforcing support shell.

15. A method as claimed in claim 10 wherein there is further provided the step of molding floor support in a bottom wall of said inner reinforcing support shell.

16. A method as claimed in claim 15 wherein said floor support comprises elongated channels formed in said outer surface of said bottom wall of said inner reinforcing support shell and wherein said step iv) further comprises immovably securing rigid floor engaging members in said elongated channels to support said bathtubs on a floor surface.

17. A method as claimed in claim 10 wherein said outer shell is formed by bonding two thermoformed shells of acrylic and ABS plastics together one inside the other with the acrylic shell on the outside.

18. A method as claimed in claim 10 wherein there is further provided the step of drilling hardware receiving bores in said inner and outer shells to receive and secure hardware and controls for said bathtubs after said outer and inner shells have been bonded together.

* * * * *